(12) United States Patent
Babington (10) Patent No.: US 7,638,738 B1
(45) Date of Patent: Dec. 29, 2009

(54) GRIDDLE COOKING SYSTEM

(75) Inventor: Robert S. Babington, McLean, VA (US)

(73) Assignee: Babington Enterprises, McLean, VA (US)

( * ) Notice: Subject to any disclaimer, the term of this patent is extended or adjusted under 35 U.S.C. 154(b) by 0 days.

(21) Appl. No.: 12/167,338

(22) Filed: Jul. 3, 2008

(51) Int. Cl.
*H05B 3/68* (2006.01)
*F24B 5/04* (2006.01)
*F24C 3/12* (2006.01)

(52) U.S. Cl. .................. 219/450.1; 126/39 R; 126/15 R
(58) Field of Classification Search . 219/443.1–448.11, 219/452.13; 126/4, 6, 39 R, 39 D, 39 H–39 K, 126/15 A, 19 R, 21 R, 21 A, 211–214 D; 99/444–447, 393–402
See application file for complete search history.

(56) References Cited

U.S. PATENT DOCUMENTS

| | | | |
|---|---|---|---|
| 2,173,166 A | 9/1939 | Hoelseher | |
| 2,362,757 A | 11/1944 | Lang | |
| 2,907,316 A | 10/1959 | Windust | |
| 3,978,782 A | 9/1976 | Werling | |
| 4,155,700 A | 5/1979 | Babington | |
| RE30,285 E | 5/1980 | Babington | |
| 4,298,338 A | 11/1981 | Babington | |
| 4,342,259 A | 8/1982 | Lee | |
| 4,507,074 A | 3/1985 | Babington et al. | |
| 4,507,076 A | 3/1985 | Babington | |
| 4,516,928 A | 5/1985 | Babington | |
| 4,573,904 A | 3/1986 | Babington | |
| 4,972,824 A * | 11/1990 | Luebke et al. | 126/21 A |
| 5,413,032 A * | 5/1995 | Bruno et al. | 99/331 |
| 5,575,197 A | 11/1996 | Cheng | |
| 5,740,723 A | 4/1998 | Lin | |
| 5,782,230 A * | 7/1998 | Linnebur et al. | 126/41 R |
| 5,975,071 A | 11/1999 | Babington | |
| 6,073,542 A | 6/2000 | Perez | |
| 6,138,554 A * | 10/2000 | McFadden et al. | 99/422 |
| 6,176,233 B1 | 1/2001 | Babington | |
| 6,196,213 B1 | 3/2001 | Van Der Woude | |
| 6,453,487 B1 | 9/2002 | Babington | |
| 6,758,207 B1 | 7/2004 | Hotard et al. | |
| 7,100,599 B2 | 9/2006 | Babington | |
| 7,188,617 B1 * | 3/2007 | O'Blenes | 126/25 R |
| 7,348,519 B2 | 3/2008 | Federspiel et al. | |
| 2006/0016348 A1 | 1/2006 | Babington | |

* cited by examiner

*Primary Examiner*—Sang Y Paik
(74) *Attorney, Agent, or Firm*—Connolly Bove Lodge & Hutz LLP (57) ABSTRACT

A griddle cooking system is disclosed. A heating block includes a heat plenum and a plurality of heat release chambers fluidically coupled to the heat plenum. Each of the heat release chambers includes a chamber opening onto a first side of the heating block. A griddle is disposed opposite the first side of the heating block and includes a cooking surface opposite an under surface. A heat distributor is disposed between the under surface and the heating block. The heat distributor includes a plurality of heat diffusers, each being disposed over one of the chamber openings, a plurality of heat deflectors disposed about each heat diffuser, each heat deflector being positioned at an angle relative to the under surface, and an exhaust port.

17 Claims, 7 Drawing Sheets

GRIDDLE COOKING SYSTEM

BACKGROUND OF THE INVENTION

1. Field of the Invention

The field of the present invention is griddle cooking systems, particularly those that are designed for use in connection with mobile kitchens, such as those depended upon by the military and humanitarian relief organizations.

2. Background

The cooking surface of a griddle is preferably maintained at a uniform predetermined temperature over the entire surface for food preparation. One or more heating elements are typically positioned underneath the cooking surface to heat the cooking surface. If more than one heating element is used, because each individual heating element heats a limited area of the cooking surface, undesirable hotter and colder zones may develop on the cooking surface. Multiple heating elements can therefore make it difficult to maintain a substantially uniform temperature over the entire cooking surface.

Single element heating elements have thus been developed in an attempt to reduce the temperature variance over the cooking surface. Such heating elements are typically serpentine in form so that the heating element can be distributed under substantially the entire cooking surface, thus also creating a better distribution of heat across the entire cooking surface. However, despite the better distribution of heat across the cooking surface, even serpentine heating elements can leave hot and cold spots. These temperature variances can develop over time as the heating element ages and sections of the serpentine structure become less efficient at generating heat. For electric-based heating elements, this can occur due to structural changes within parts of the heating element due to repeated heating and cooling. In gas-based heating elements due to the accumulation of debris causing blockages in the fuel distribution passageways.

SUMMARY OF THE INVENTION

The present invention is directed toward a griddle cooking system. As part of the system, a heating block includes a heat plenum and a plurality of heat release chambers fluidically coupled to the heat plenum. Each of the heat release chambers includes a chamber opening onto a first side of the heating block. A griddle is disposed opposite the first side of the heating block and includes a cooking surface opposite an under surface. A heat distributor is disposed between the under surface and the heating block. The heat distributor includes a plurality of heat diffusers, each disposed over one of the chamber openings, a plurality of heat deflectors disposed about each heat diffuser, each heat deflector positioned at an angle relative to the under surface, and an exhaust port.

Additional options may be incorporated into the griddle cooking system. As one option, a perforated panel may be disposed atop the heat distributor adjacent the under surface of the griddle. The perforated panel may aid in more evenly distributing heat across the under surface by forming a heating cavity between the perforated panel and the undersurface of the griddle. Heat distribution may be further controlled by varying the volume of the heating cavity. As another option, temperature sensitive elements may be embedded within the griddle. Placement of such temperature sensitive elements aid the operator in keeping the cooking surface at a desired cooking temperature. As yet another option, the heat diffusers may be in the form of perforated wall structures. Still further, the perforated wall structures may be formed as an A-frame structure. Any of the foregoing options may be implemented alone or in combination.

Accordingly, an improved griddle system is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
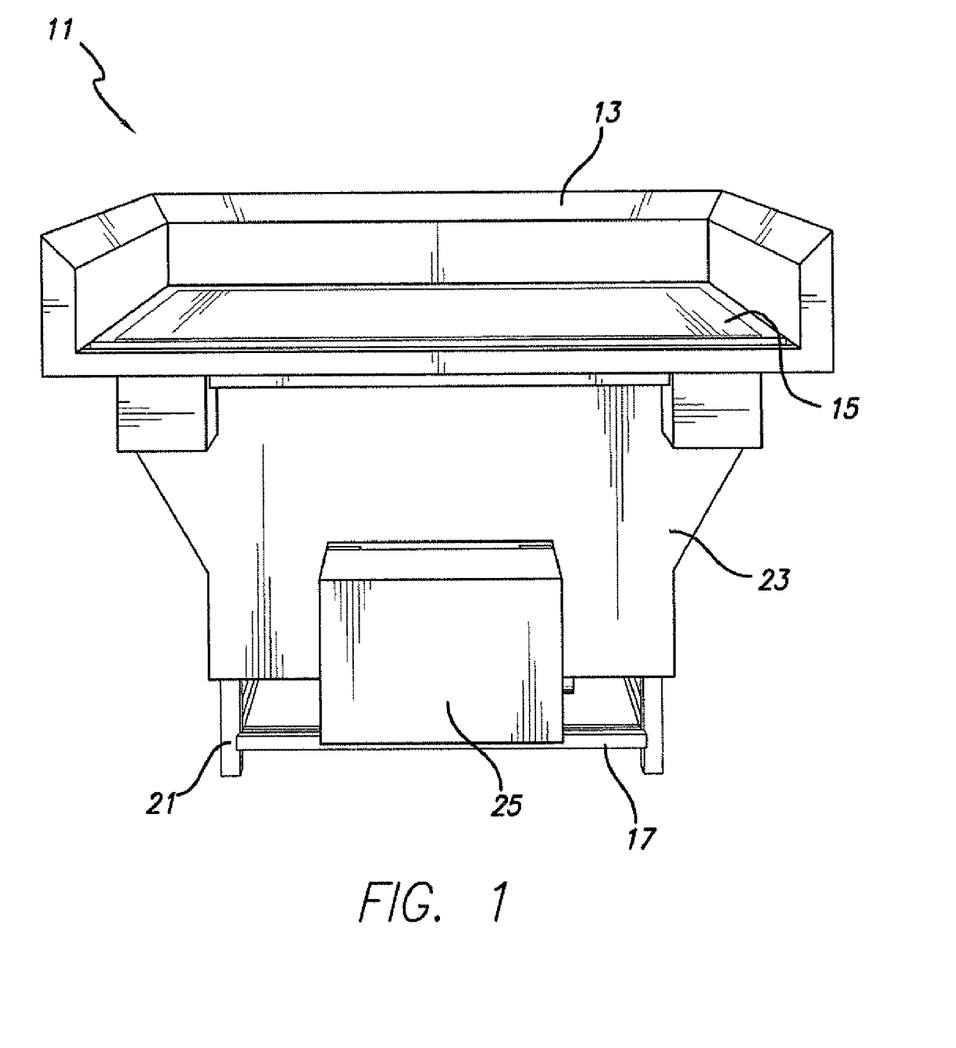
FIG. 1 is a perspective view of a griddle cooking assembly.

Turning in detail to the drawings, FIG. 1 illustrates a griddle cooking assembly 11 having a griddle 13, which includes a cooking surface 15, sitting atop a support frame 17. The support frame 17 includes a plurality of legs 21, with the particular structure and design of the support frame 17 and legs 21 being a matter of design preference. The cooking assembly 11 also includes two outer covers 23, 25, both of which serve cosmetic and protective functions. As such, the structure and design of the outer covers 23, 25 is also a matter of design preference. The first outer cover 23 is placed primarily over the heating block and the heat distributor, both of which are discussed in further detail below. The second cover 25 is placed over the liquid fuel burner for the griddle system 11. This second cover 25 is intended to be easily removable for servicing the liquid fuel burner. In addition, insulation may be included between the covers 23, 25 and the heated parts of the griddle cooking assembly 11 described below.

The liquid fuel burner (not shown) is preferably of the type generally described in U.S. Pat. No. 4,298,338, the disclosure of which is incorporated herein by reference in its entirety. Advancements in this type of liquid fuel burner may be found in U.S. Pat. No. 4,507,076 and U.S. Pat. No. 4,573,904, the disclosures of which are incorporated herein by reference in their entirety. Such liquid fuel burners are available from Babington Technology, of McLean, Va., and are advantageous because they can burn any distillate fuel efficiently and cleanly without smoke, odor, or carbon monoxide emissions. Alternatively, other types of heat generators may be used in conjunction with the griddle system. Those skilled in the art will recognize that the heat output capabilities of the heat generator selected for use with the griddle system will in large part determine the maximum temperature at which the cooking surface can be maintained.

Figure 2:
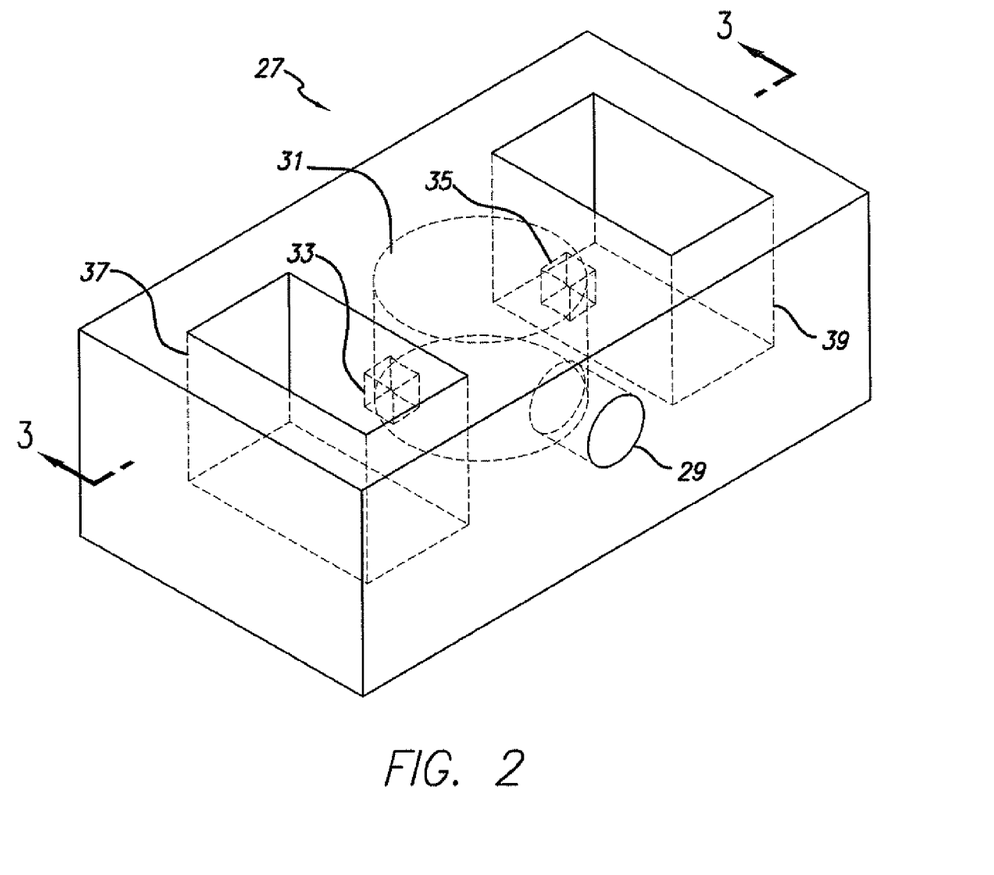
FIG. 2 is a perspective view of a heating block for a griddle cooking assembly.
Figure 3:
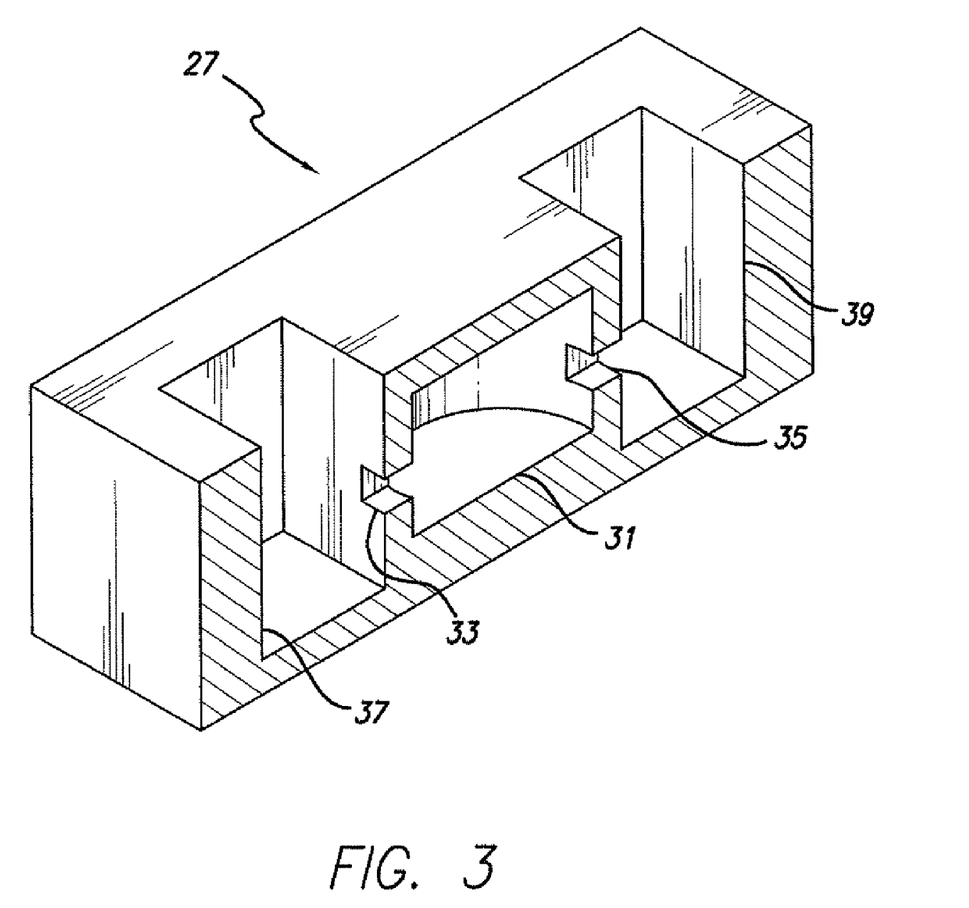
FIG. 3 is a sectional view of the heating block of FIG. 2 along the line 3-3.

The heating block 27 is shown in FIGS. 2 and 3. The heating block 27 is supported by the support frame mentioned above and includes a port 29 which is configured to receive the flame tube of a liquid fuel burner. The port 29 opens up into a heat plenum 31, and the heat plenum 31 has passages 33, 35 on either side to fluidically connect it with two heat release chambers 37, 39. Each of the heat release chambers 37, 39 opens upon onto the top of the heating block 27, so that during operation, heat from the heat plenum 31 passes into each of the heat release chambers 37, 39 and up and out of the heating block 27.

Figure 4:
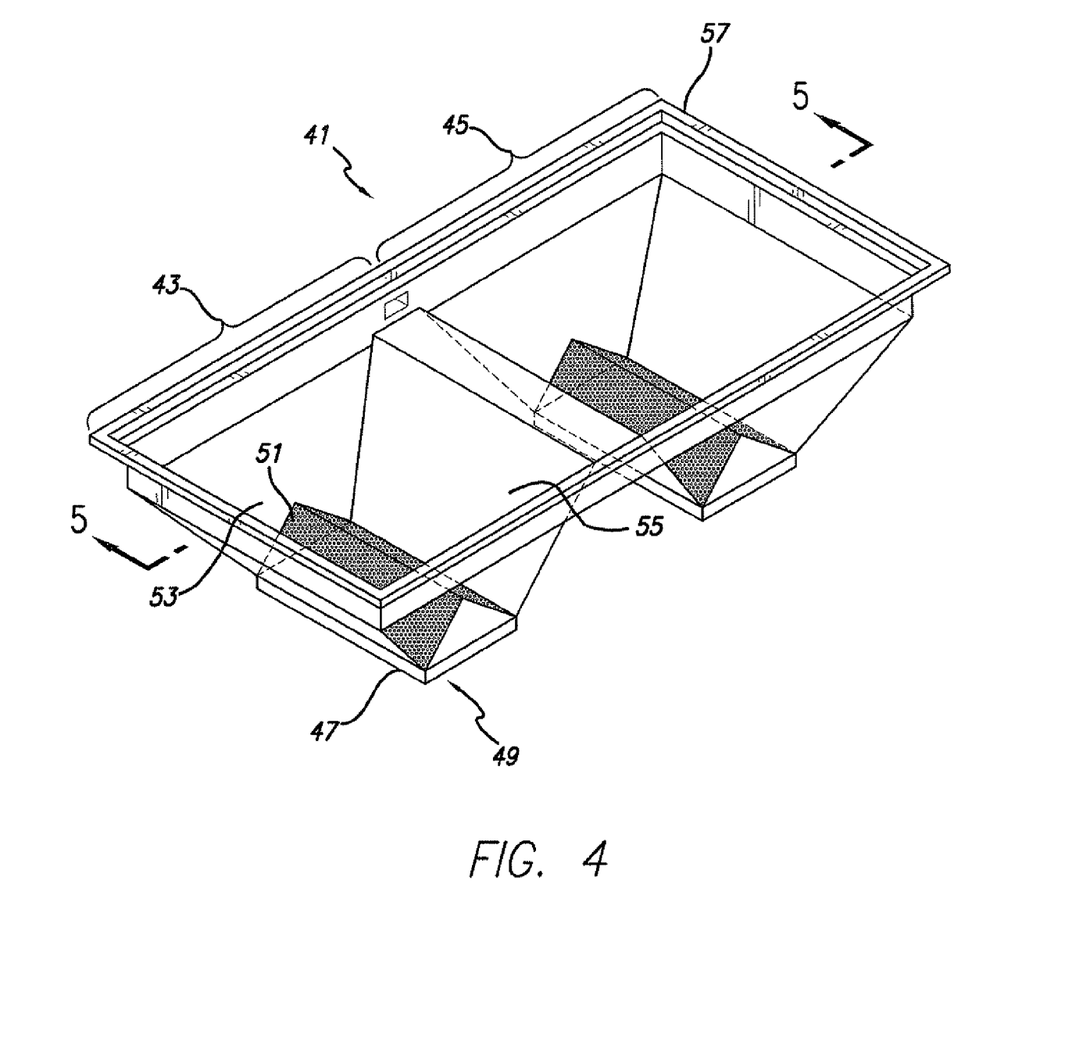
FIG. 4 is a perspective view of a heat distributor for a griddle cooking assembly.
Figure 5:
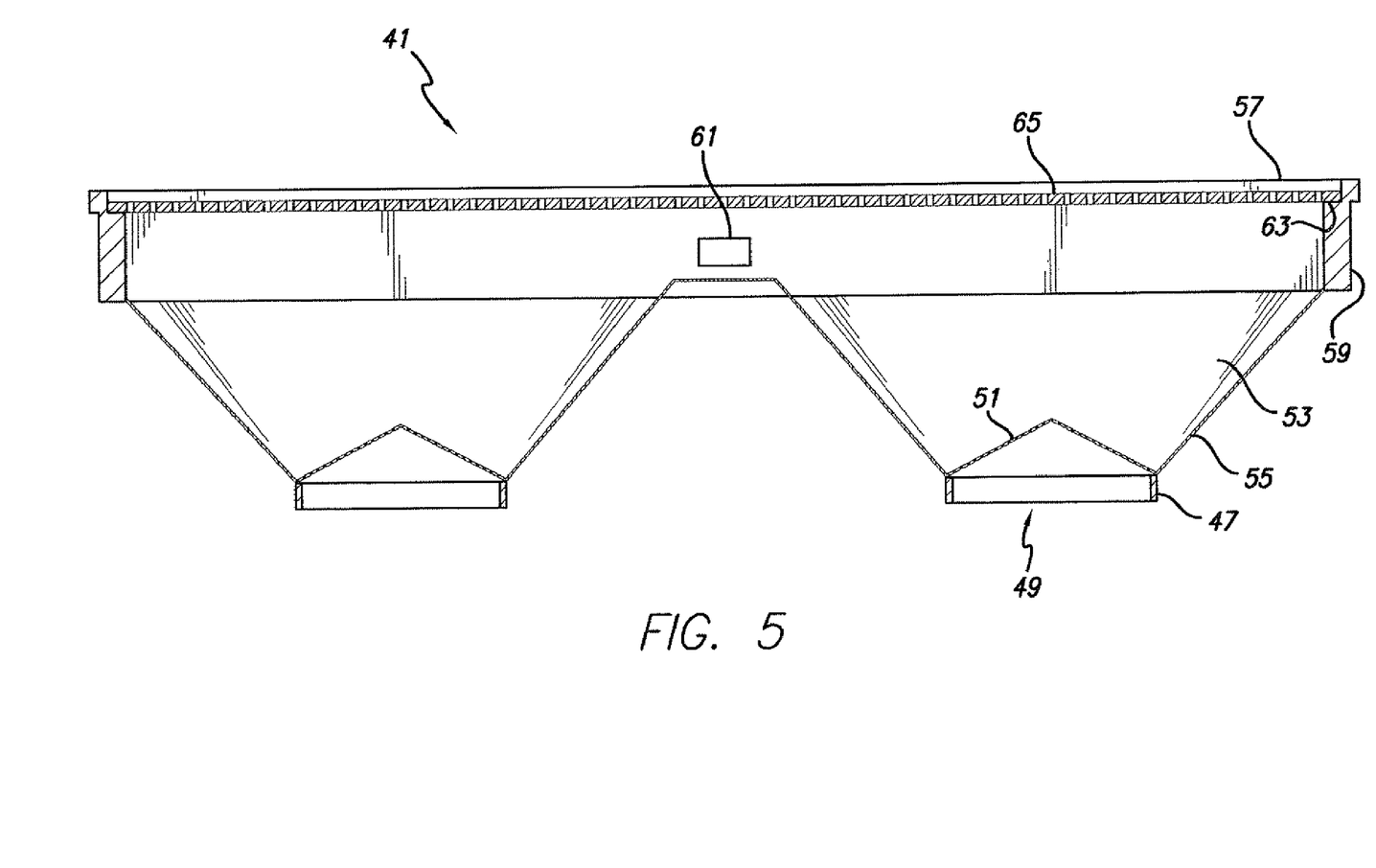
FIG. 5 is a sectional view of the heat distributor of FIG. 4 along the line 5-5.

FIGS. 4 and 5 illustrate the heat distributor 41 that is placed on top of the heating block 27 and used to direct heat upward toward the under surface of the griddle. The heat distributor 41 is divided into two sections 43, 45, one for each of the chamber openings in the heating block. Additional sections may be included if additional heat release chambers are included in the heating block. The bottom of each section includes a downward extending flange 47 around the perimeter of an opening 49 through which hot exhaust gases enter the heat distributor 41 from the heat release chambers of the heating block. These downward extending flanges 47 are inserted into the heat distribution chamber openings so that the heat distributor 41 may be stably seated onto the heating block. With reference to FIG. 5, each section 43, 45 includes heat diffusers, shown in the form of perforated walls 51, disposed across the opening 49. The perforated walls 51 are in an A-frame configuration across the opening 49. The density of perforations across the perforated walls 51 is preferably at least ¼ sq. in. for every ¾ sq. in. of the perforated walls 51. Other forms or configurations of heat diffusers may also be used. By being in this A-frame configuration, the perforated walls 51 aid in distributing hot gases rising out of the heat release chambers into the wider volume within the heat distributor 41. The perforated walls 51 introduce sufficient resistance into the flow path of the hot gases to redirect the hot gases normal to the perforated walls 51 upon traverse. Additional walls 53, 55 are disposed on all sides of the perforated walls 51, each of these walls 53, 55 being placed at an angle to the A-frame perforated walls 51, and also at an angle to the top 57 of the heat distributor 41, to aid in directing the hot gases up toward the top of the heat distributor 41.

The top portion of the heat distributor 41 includes a rectangular frame 59, which forms a planar top, and an exhaust port 61 disposed in the side thereof. The rectangular frame 59 also includes a lip 63 around the top perimeter, and this lip 63 provides a seating surface for a perforated cover 65 which spans across the entire top portion of the heat distributor 41. The perforated cover 65, while seated on the lip 63, does not extend all the way to the top of the heat distributor 41. Rather, space is left between the top of the heat distributor 41 and the top of the perforated cover 65, so that when the griddle is seated on the heat distributor 41, a heating cavity is formed, between the perforated cover 65 and the under surface of the griddle, in which heated air can freely circulate after passing up through the perforations in the perforated cover 65. The perforations in the perforated cover 65 are preferably evenly distributed across the entire perforated cover 65, although an uneven distribution might be used as well. The density of perforations across the perforated cover 65 is preferably at least ¼ sq. in. for every square inch of the perforated cover 65, although the density may be varied according to design considerations and desired heat distribution.

Figure 6:
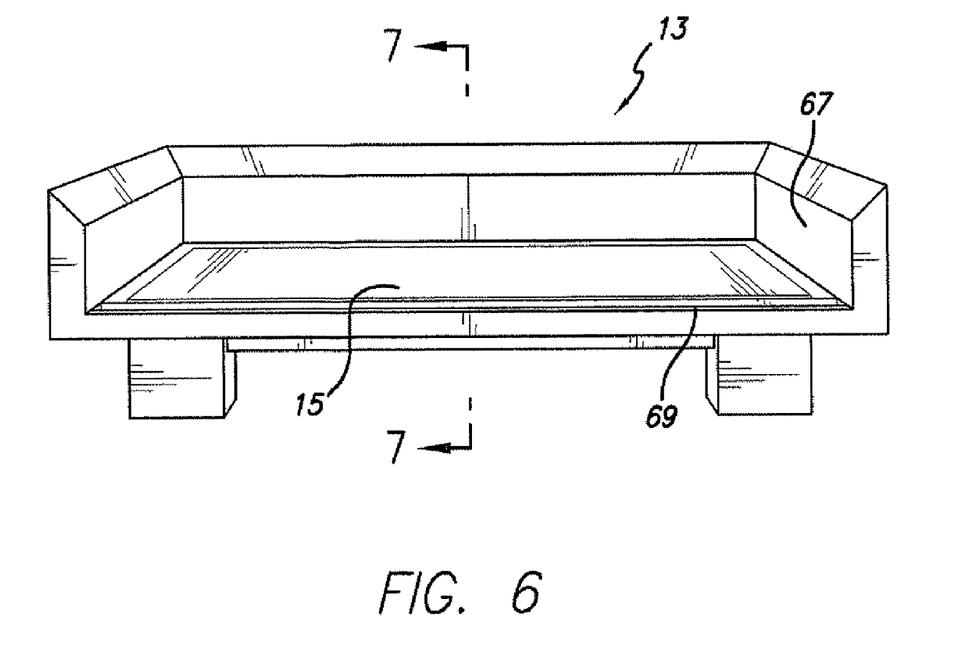
FIG. 6 is a perspective view of a griddle for a griddle cooking assembly.
Figure 7:
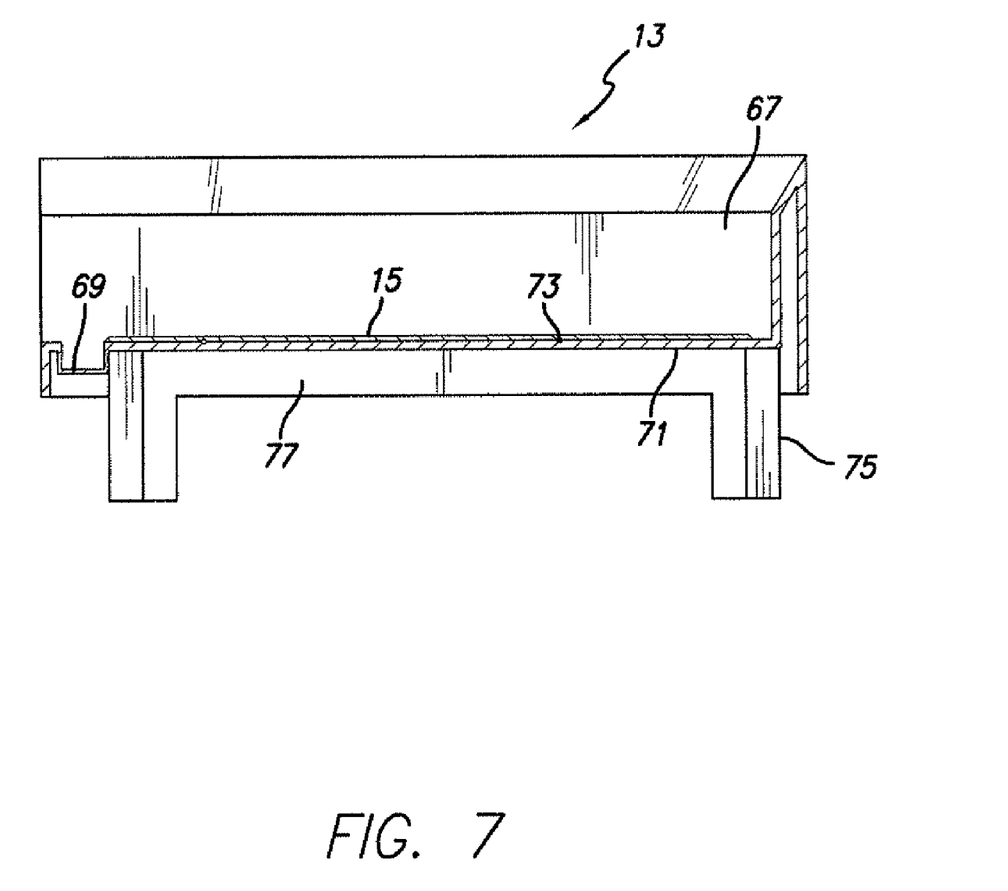
FIG. 7 is a sectional view of the griddle of FIG. 6 along the line 7-7.

FIGS. 6 and 7 illustrate the griddle 13. As seen in FIG. 6, the griddle 13 includes a cooking surface 15 surrounded on three sides by walls 67, and on a fourth side, a grease trap 69 is disposed in front of the cooking surface 15. Preferably, the cooking surface 15 is constructed from stainless steel, although other appropriate materials may be used. The cooking surface 15, along with the other elements on the upper side of the griddle 13, may be constructed according to design choice.

As seen in FIG. 7, the cooking surface 15 is layered atop an under surface 71 with heat sensors 73 disposed between the two surfaces 15, 71. The under surface 71 is preferably constructed from a high heat conduction material, such as aluminum, to aid in creating a more uniform distribution of heat across the entire cooking surface 15. As with the cooking surface 15, the under surface 71 may be constructed from any appropriate material as a matter of design choice. The heat sensors 73 are preferably thermocouples, and as many or as few heat sensors or thermocouples may be included between the cooking surface 15 and the under surface 71 as desired. Each heat sensor 73 is electronically connected to an appropriate temperature sensing and control system (not shown) so that the temperature of the cooking surface 15 may be controlled during use. Such temperature sensing and control systems are well known to those skilled in the art, and as such, are not discussed in further detail herein.

The under surface 71 is supported by legs 75 and cross-supports 77 around the perimeter of the under surface 71. The legs 75 are constructed so that the griddle 13 may be placed on top of the heat distributor, with the top of the heat distributor positioned immediately adjacent the under surface 71 of the griddle. Each leg 75 of the griddle 13 is therefore shaped to seat over a corner of the heat distributor, with the distance between the legs being sufficient to allow the entire top portion of the heat distributor to slide up into position against the under surface 71 of the griddle 13.

Constructed as described above, it is anticipated that a single Babington 2000 Multi-Fuel Burner will be capable of heating the cooking surface up to 450 degrees, with the temperature variant across an entire 48"×30" cooking surface being no more than plus or minus 15 degrees. Use of other types of burner assemblies is expected to yield different maximum temperature and temperature variant results, depending upon the total heat output capacity of the burner assembly.

Thus, a griddle system is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A griddle cooking system comprising:
a heating block including a port configured to receive a distillate liquid fuel burner, a heat plenum into which the port opens, and at least one heat release chamber fluidically coupled to the heat plenum, wherein each heat release chamber includes a chamber opening onto a first side of the heating block;
a griddle disposed opposite the first side of the heating block, the griddle including a cooking surface opposite an under surface; and
a heat distributor disposed between the under surface and the heating block, the heat distributor including:
at least one heat diffuser, each heat diffuser being disposed over one of the chamber openings;
a plurality of heat deflectors disposed about each heat diffuser, each heat deflector being positioned at an angle relative to the under surface; and
an external exhaust port;
wherein products of combustion from the distillate liquid fuel burner pass from the heating block, up into the heat distributor to heat the griddle, and out through the external exhaust port without recirculation.

2. The system of claim 1, wherein the heat plenum is configured to receive heat from a burner assembly.

3. The system of claim 1, further comprising a perforated panel disposed atop the heat distributor adjacent the under surface.

4. The system of claim 3, wherein a heating cavity is formed between the under surface and the perforated panel.

5. The system of claim 1, further comprising a plurality of temperature sensitive elements embedded within the griddle.

6. The system of claim 5, wherein each temperature sensitive element comprises a thermocouple.

7. The system of claim 1, wherein each heat diffuser comprises a perforated wall.

8. The system of claim 7, wherein each perforated wall comprises an A-frame structure.

9. The system of claim 1, wherein each heat deflector is positioned to direct heat emerging from one of the heat diffusers toward the under surface.

10. The system of claim 1, wherein the under surface comprises aluminum.

11. The system of claim 1, wherein the cooking surface comprises stainless steel.

12. A griddle cooking system comprising:
- a heating block including a port configured to receive a distillate liquid fuel burner, a heat plenum into which the port opens, and a plurality of heat release chambers fluidically coupled to the heat plenum, wherein each of the heat release chambers includes a chamber opening onto a first side of the heating block;
- a griddle disposed opposite the first side of the heating block, the griddle including a cooking surface opposite an under surface;
- a heat distributor disposed between the griddle and the heating block, the heat distributor including:
  - a plurality of perforated A-frame walls, each being disposed over one of the chamber openings;
  - a plurality of heat deflectors disposed about each perforated A-frame wall, each heat deflector being positioned to direct heat emerging from the perforated A-frame walls toward the under surface; and
  - an external exhaust port; and
- a perforated panel disposed atop the heat distributor adjacent the under surface, such that a heating cavity is formed between the under surface and the perforated panel,
- wherein products of combustion from the distillate liquid fuel burner pass from the heating block, up into the heat distributor to heat the griddle, and out through the external exhaust port without recirculation.

13. The system of claim 12, further comprising a plurality of temperature sensitive elements embedded within the griddle.

14. The system of claim 12, wherein each temperature sensitive element comprises a thermocouple.

15. The system of claim 12, wherein the heat plenum is configured to receive heat from a burner assembly.

16. The system of claim 12, wherein the under surface comprises aluminum.

17. The system of claim 12, wherein the cooking surface comprises stainless steel.

* * * * *